Figure 1:
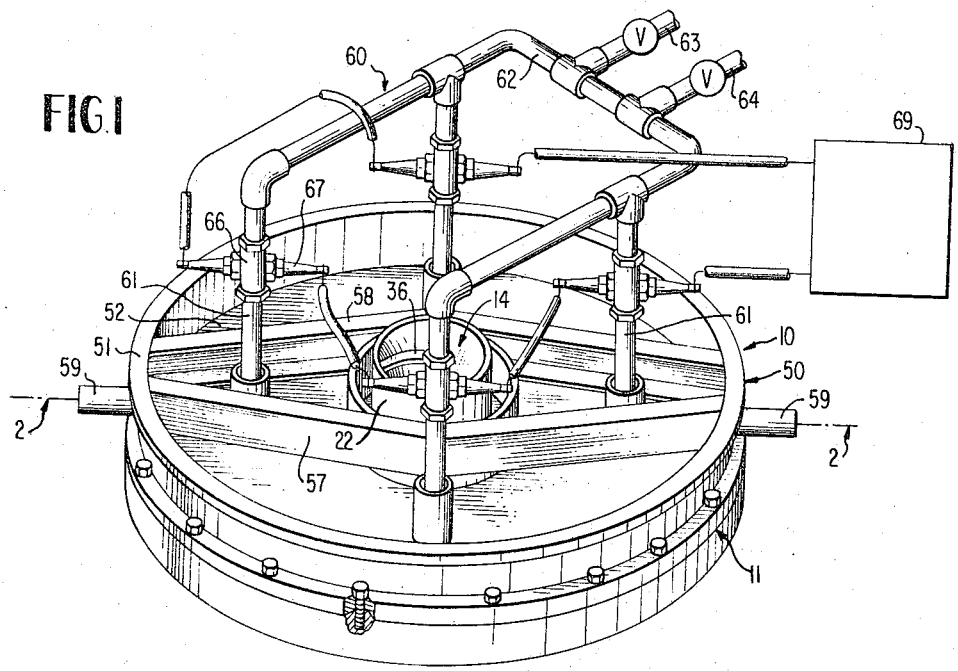

Aug. 29, 1967     A. CHATENEVER     3,338,330

GAS EXPLODER HAVING THRUST NOZZLE REACTION MEANS

Filed May 11, 1965

INVENTOR
ALFRED CHATENEVER

BY McLean, Morton, & Boustead

ATTORNEY

United States Patent Office
3,338,330
Patented Aug. 29, 1967

3,338,330
GAS EXPLODER HAVING THRUST NOZZLE
REACTION MEANS
Alfred Chatenever, Tulsa, Okla., assignor, by mesne assignments, to Sinclair Research, Inc., New York, N.Y., a corporation of Delaware
Filed May 11, 1965, Ser. No. 454,899
5 Claims. (Cl. 181—.5)

The present invention relates to geophysical prospecting and in particular provides a device for imparting a compressive impulse at the earth's surface.

As described in co-pending applications Serial No. 187,111, filed Apr. 12, 1962, now Patent No. 3,235,027, and Ser. No. 314,230, filed Oct. 7, 1963, a gas explosion confined in a vertically expansible chamber acting at the earth-air interface against a large mass positioned above such gas explosion can be utilized to impart a compressive impulse to the surface of the earth beneath the gas explosion thereby initiating a seismic wave useful for seismic prospecting by refraction and reflection techniques, since the impulse imparted to the surface of the earth has a high energy content and can be made of extremely short duration. Also, the chamber in which the explosion is confined is vented the moment vertical extension of the sidewalls occurs, since the useful energy imparted to the earth in such a device occurs at the moment of the explosion before there is any significant upward movement of the top of the device occurring as a result of the explosion. Ordinarily, the shock wave produced by the gas explosion in the chamber would be transmitted equally in all directions; however, the great inertia of the large mass surmounting the chamber and the lateral rigidity of the walls of the chamber direct the major portion of the force of the explosion downwardly against the bottom plate of the chamber to apply compressive force at the earth interface beneath the chamber to initiate the seismic wave. The weight of the large mass, its size, and the requirement that it be lifted, however create problems in transporting and utilizing the device since this mass will weigh on the order of several thousand pounds.

It is an object of this invention to provide a device capable of initiating a seismic wave similar to the device of the above-mentioned copending application which does not require a large mass positioned above the gas explosion. In accordance with this invention, an effective gas exploder can be provided using a closed chamber without the necessity of superimposing a large mass thereon by forming the chamber for confining the gas explosion with a top having an exhaust arrangement for the chamber so constructed that it forms according to the principles of jet propulsion a thrust or propulsion nozzle directed upward with respect to the ground. The configuration of the thrust nozzle is of conventional design and the pressure ratio across the nozzle is such that, after an explosion in the chamber, release of the exploded gas through the nozzle generates sufficient reactive propulsive force above such explosion to direct the major portion of the force of the explosion downwardly against the bottom of the chamber and apply a compressive force at the earth interface beneath the chamber thereby initiating a seismic wave.

Figure 2:
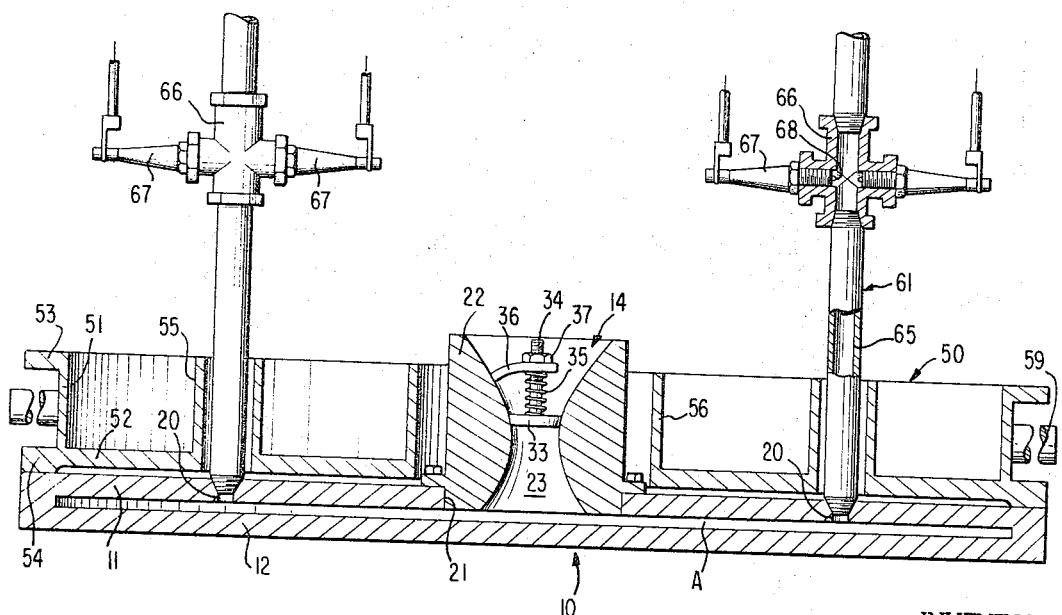

For a more complete understanding of the practical aplication of this invention reference is made to the appended drawings in which:

FIGURE 1 is an isometric view of a gas exploder constructed in accordance with the present invention; and, FIGURE 2 is a vertical section taken at line 2—2 in FIGURE 1.

Referring more particularly to FIGURE 1 the reference number 10 designates a gas exploder constructed in accordance with the present invention. Gas exploder 10 basically includes a chamber A, see FIGURE 2, formed by a thick casting including top 11 and bottom 12. Top 11 which comprises a thick, annular, steel plate is provided with four small, tapped, vertical openings 20 disposed at 90° approximately midway between its rim and a central opening 21. A generally annular, iron casting 22 is coaxially positioned in the opening 21. Casting 22 forms a nozzle housing and has an open center 23, the configuration of which is that of a thrust nozzle.

Valve 14 which normally closes thrust nozzle 23 includes valve body 33 and valve rod 34 secured to body 33. Valve rod 34 is suported by element 36 and helical spring 35 surrounds rod 34 beneath element 36 and bears against valve body 33 to normally maintain valve 14 closed. Valve body 33 has a machined outside surface sized to fit snugly but slidingly within the upper portion of the thrust nozzle 23. A valve retainer, nut 37, which is threaded onto the upper end of rod 34 holds the valve 14 in place and can be used to adjust the compression of spring 35.

It will be noted gas exploder 10, as illustrated in FIGURES 1 and 2, is further equipped with a shallow cylindrical tank 50 including, as an integral part, a cylindrical sidewall 51, an annular bottom plate 52, outwardly extending, annular flanges 53 and 54 at the upper and lower ends of sidewall 51, respectively, and four upstanding sleeves 55 having their lower ends disposed in openings in plate 52 registering with openings 20 but having wider diameters than openings 20. In addition the central aperture of plate 52, which is wider than nozzle housing 22, is provided with an upstanding sleeve 56 surrounding the nozzle housing. Tank 50 is further provided with a pair of slightly bowed braces 57 and 58, see FIGURE 1, which are in juxtaposition with their adjacent end pairs close and welded to the inside of sidewall 51 and with their centers bowed away from each other with sleeve 56 between them.

Exteriorly tank 50 is provided at diametrically opposite positions in its sidewall 51 with a pair of outwardly extending stub shafts 59 which are secured to sidewall 51, each adjacent one pair of adjacent ends of braces 57 and 58. Stub shafts 59 can be used for carrying gas exploder 10 in a fork-type device. If desired, tank 50 can retain a lead casting within sidewall 51 for extra weight. In such case sleeves 55 and sleeve 56 serve to provide access to openings 20 and to valve 14.

Referring to FIGURE 1 gas exploder 10 further requires a gas charging and ignition system generally designated by the reference number 60. Charging and ignition system 60 basically includes four upstanding conduits 61 interconnected at their upper ends through a header 62 to separate valved connections 63 and 64 leading to storage cylinders respectively for a suitable combustible gas such as propylene, propane, acetylene, etc., and for oxygen.

Each upstanding conduit 61 includes a pipe section 65 threadedly received at its lower end in a tapped aperture 20 in top 11 and, threadedly received on the upper end of such pipe section 61, a four way fitting 66. Header 62 generally includes suitable nipples, elbows, and T's as well as pipe sections to provide a U-shaped connection communicating the upper openings of four-way fittings 66 with valved conduits 63 and 64 which are preferably connected to the bottom of the U.

Eight spark plugs 67 having their ground electrodes removed are connected, two to each four-way fitting 66, in the lateral openings of fittings 66 such that, as shown most clearly in FIGURE 2, the insulated electrodes 68 of each thusly associated pair of plugs 67 face each other in such fitting 66. Exteriorly the spark plugs 67, thus mounted, are electrically connected in series across a suitable electrical supply 69 which is capable of impressing a high voltage, typically on the order of 70,000 volts, across serially interconnected spark plugs 67 at any desired instant in time.

In operation gas exploder 10 is located at a suitable location with bottom 12 resting on the ground at a spot clear of large stones and other undesirable structure. Typically spring 35 is under sufficient compression such that operation of valve 14 does not occur until a pressure within exploder 10 on the order of 30 p.s.i.g. has been reached. Valved conduits 63 and 64 are then opened to admit fuel gas, e.g. propylene and oxygen until a pressure in exploder 10 on the order of 2–5 p.s.i.g. has been achieved. (It will be apparent that a stoichiometric mixture of oxygen and propylene are sought and that this is achieved quite simply by introducing the gases such that the partial pressures of each are in proportion to the molar ratio of a stoichiometric mixture, i.e. $4.5:1::O_2:C_3H_6$.)

With valved conduits 63 and 64 closed, exploder 10 is properly charged and an explosion can be initiated simply by actuating high voltage source 69 at the desired point in time, whereupon high potential is placed across the serial connection of the eight spark plugs 67. It will be apparent that in the event of any fouling of spark plugs 67 at least two active gaps from an electrode 68 to ground or another electrode 68 are nevertheless provided such that combustion of the mixture of gases within exploder 10 is initiated with a resultant explosion occuring substantially simultaneously with energization of plugs 67.

As the gases are exploded in chamber A, valve 14 opens due to the pressure of the expanding gases against the valve body 33 which comprises spring 35 and the gases pass through nozzle 23. The continued expansion of the exploding gases through nozzle 23 creates sufficient force to drive the bottom 12 downward against the earth. The vent action through valve 14 is so rapid that normally the pressure is relieved within a fraction of a second. Generally after such reduction in pressure, the pressure remaining between top 11 and bottom 12 in chamber A is substantially negative to atmosphere, being on the order of five p.s.i.a., so that, in some instances spring 35 can be omitted. Usually as a result of the negative pressure in chamber A, valve 14 closes immediately and it is unnecessary in subsequent firing to purge the interior of gas exploder 10 when recharging, and recharging is so fast that repetitive firing at significantly rapid rates is feasible.

It is claimed:

1. A device for propagating a seismic wave at the surface of the earth including means defining a chamber having a rigid bottom adapted to rest on the surface of the earth and a rigid top, and exhaust means for said chamber including means defining an opening in said top providing external communication to said chamber, thrust nozzle means positioned in said opening and valve means in said thrust nozzle normally closing said chamber and operable upon a predetermined increase in pressure in said chamber to temporarily open thereby communicating said chamber with the exterior through said thrust nozzle until the pressure in said chamber decreases.

2. A device according to claim 1 wherein said valve means normally closing said chamber includes a valve body normally seating in said thrust nozzle and closing the same and means for biasing said valve body closed in the absence of said predetermined increase in pressure.

3. A device according to claim 2 wherein said valve body has an upstanding rod secured thereto and said means for biasing said valve body comprises support means attached to said thrust nozzle means, said rod extending through said support means, and a spring surrounding said rod and pressing against said support means to normally close said chamber.

4. A device for propagating a seismic wave at the surface of the earth including means defining a chamber having a rigid bottom adapted to rest on the surface of the earth and a rigid top, and exhaust means for said chamber including means defining an opening in said top providing external communication to said chamber, thrust nozzle means positioned in said opening, means in said thrust nozzle normally closing said chamber and operable upon a predetermined increase in pressure in said chamber to open thereby communicating said chamber with the exterior through said thrust nozzle and a gas charging and igniting system including conduit means positioned above said top and connected thereto to provide external communication to said chamber and a pair of insulated electrodes positioned in said conduit means to define a spark gap therein.

5. A device for propagating a seismic wave at the surface of the earth including means defining a chamber having a rigid bottom adapted to rest on the surface of the earth and a rigid top, and exhaust means for said chamber including means defining an opening in said top providing external communication to said chamber, thrust nozzle means positioned in said opening, means in said thrust nozzle normally closing said chamber and operable upon a predetermined increase in pressure in said chamber to open thereby communicating said chamber with the exterior through said thrust nozzle, and a gas charging and igniting system including conduit means positioned above said top having a plurality of connections thereto to provide external communication to said chamber, a pair of insulated electrodes positioned in each said conduit connection to define a spark gap therein, and means interconnecting said electrodes whereby said spark gaps are electrically connected in series.

References Cited

UNITED STATES PATENTS

| | | | |
|---|---|---|---|
| 3,112,669 | 12/1963 | Damblanc | 102—49 X |
| 3,216,320 | 11/1965 | Thomas et al. | 102—49 X |
| 3,235,027 | 2/1966 | Kilmer | 181—.5 |
| 3,256,501 | 6/1966 | Smith | 181—.5 |

SAMUEL FEINBERG, *Primary Examiner.*

BENJAMIN A. BORCHELT, *Examiner.*

G. H. GLANZMAN, *Assistant Examiner.*